United States Patent [19]
Inoue

[11] 4,430,544
[45] Feb. 7, 1984

[54] EDM MACHINE TOOL WITH COMPOUNDED ELECTRODE-RECIPROCATION AND SERVO-FEED DRIVERS

[75] Inventor: Kiyoshi Inoue, Tokyo, Japan

[73] Assignee: Inoue-Japax Research Incorporated, Japan

[21] Appl. No.: 289,147

[22] Filed: Aug. 3, 1981

[30] Foreign Application Priority Data

Aug. 5, 1980 [JP] Japan .................... 55-106726

[51] Int. Cl.³ .......................... B23P 1/08
[52] U.S. Cl. .................. 219/69 V; 219/69 M
[58] Field of Search ............ 219/69 V, 69 D, 69 G, 219/69 M, 69 R, 68

[56] References Cited

U.S. PATENT DOCUMENTS

| | | | |
|---|---|---|---|
| 2,441,319 | 5/1948 | Harding | 219/69 V |
| 3,396,259 | 8/1968 | Easton | 219/69 G |
| 3,564,184 | 2/1971 | Kandajan et al. | 219/69 V |
| 3,725,631 | 4/1973 | Angelucci et al. | 219/69 V |
| 4,152,570 | 5/1979 | Inoue et al. | 219/69 V |
| 4,247,749 | 1/1981 | Wavre | 219/69 V |

Primary Examiner—M. H. Paschall
Attorney, Agent, or Firm—Karl F. Ross; Herbert Dubno

[57] ABSTRACT

An improved EDM machine tool is disclosed in which an electrode reciprocating assembly is mechanically coupled between a movable (e.g. tool) electrode and a machine-head spindle which is axially driven by a motor in response to servo-feed signals. The assembly includes a rotary member driven by a separate motor to reciprocating rotate through a limited angle of rotation and link means for converting a reciprocatory rotary movement of the rotary member into a corresponding rectilinear reciprocal movement of the movable electrode in the servo-feed direction or a direction perpendicular thereto. The stroke and period of electrode reciprocation are determined by the angle and rate of rotation of the rotary member, respectively. The servo-feed operation, especially advance-feed movement therein is interrupted while the reciprocating assembly is in operation. The reciprocating operation is preferably conducted in synchronism with the dielectric flushing operation.

20 Claims, 2 Drawing Figures

EDM MACHINE TOOL WITH COMPOUNDED ELECTRODE-RECIPROCATION AND SERVO-FEED DRIVERS

FIELD OF THE INVENTION

The present invention relates to an electrical discharge machining (EDM) machine tool with a compound electrode-reciprocation and servo-feed drivers and, more particularly, to a novel and improved EDM machine tool with such a driver system and to a method utilizing such a driver system.

BACKGROUND OF THE INVENTION

In the electrical discharge machining (EDM) process, a tool electrode in the form of a three-dimensionally shaped solid body or piece of sheet metal is juxtaposed with a workpiece electrode across a machining gap filled with a liquid machining medium or dielectric (e.g. kerosene, transformer oil, distilled water or weakly conductive water). Electric energy in the form of discrete electrical pulses is supplied across the machining gap to effect a succession of electrical discharges between the tool and workpiece electrodes to remove material from the latter. As material removal proceeds, the tool electrode is advanced relatively towards the workpiece electrode by a servo system adapted to maintain the machining gap substantially constant in size, thereby permitting material-removal discharges to be successively created and the tool electrode to be progressively sunk into the workpiece electrode so that a cavity generally conforming in shape to the tool electrode and of a desired depth may eventually be formed in the workpiece electrode. In such sinking type EDM operations, the tool electrode may be advanced vertically by displacing a supporting machine-head spindle with the servo system motor and additional relative movements may be imparted to the tool electrode and the workpiece electrode in a horizontal plane orthogonal to the spindle axis so as to generate in the workpiece a cavity similar in shape to the tool electrode or different therefrom.

Parameters of individual and successive electrical discharges, i.e. pulse on-time ($\tau$on), peak current (Ip) and off-time ($\tau$off) are determinative of machining results, e.g. removal rate, surface roughness and relative electrode wear and, therefore, are individually or in combination particularly adjusted to establish a particular machining condition suitable for achieving the desired machining end result factors.

In the course of the machining operation, it is important to ensure that chips, gases and tar produced by machining discharges are removed from the gap site. To this end, means for continuously or intermittently flushing the machining gap with a fresh machining liquid has commonly been utilized and also means for intermittently retracting the tool electrode away from the workpiece electrode or continuously or cyclically reciprocating the tool electrode away from and towards the workpiece electrode has been provided to allow the fresh machining medium to be pumped into the machining gap and the machining contaminants to be forcibly carried away from the latter.

In order to increase the removal rate, it is also desirable to operate the electrode-feed servo-control system so as to minimize production of non-striking pulses, i.e. pulses which do not cause discharge. The gap spacing can accordingly be reduced but this can also facilitate production of a continuous arc or result in difficulty in gap flushing or decontamination. The attempt to facilitate machining discharges tends to lower the removal rate while the setting of the servo system so as to widen the threshold gap spacing leads to an increased frequency of non-striking pulses.

It will be apparent that a reliable and accurate mechanical arrangement is essential to achieve desired movements of the tool or movable electrode and that this arrangement should also desirably operate in conjunction with the machining liquid flushing unit. In conventional arrangements, a common motor has typically been used to perform both the servo and electrode reciprocating operations; the motor has been coupled drivingly with the machine-head spindle and operated in response to signals furnished from two independent sources. In these arrangements, the tool electrode must be reciprocating driven so as to be integral with the machine-head spindle; it has been found that, especially when it is moved down in each reciprocating cycle at a high speed, it tends to over-travel and tends to collide with the workpiece electrode, thus damaging the tool or workpiece electrode or both. There has accordingly been a practical limit both in increasing the stroke and reducing the period of reciprocation. Another problem with the conventional arrangements is that it has been difficult to establish the stroke and the period of electrode reciprocation independently from one another and over wider ranges which are required in accordance with the particular surface areas and shapes of the tool electrode, particular machining depths and particular EDM conditions encountered by the machining gap. Unduly costly and highly complex sophistication of the equipment is unavoidable in earlier systems to achieve the desired results.

OBJECTS OF THE INVENTION

It is, accordingly, an important object of the present invention to provide a novel and improved EDM machine tool having a relatively simple and inexpensive mechanical structure which allows reliable, accurate and fail-safe servo-feed and electrode reciprocation operations to be achieved.

Another important object of the invention is to provide an EDM machine tool whereby both the stroke and period of the electrode reciprocation are adjustable without the inconvenience of interdependence and over relatively wide ranges.

A further important object of the present invention is to provide a novel and improved EDM method which is capable of reducing the total machining time in comparison with that of the conventional practice for a given EDM operation.

SUMMARY OF THE INVENTION

In accordance with the present invention, there is provided in a first aspect thereof an EDM machine tool of the class wherein a tool electrode and the workpiece electrode one of which is movable, are spacedly juxtaposed with one another to define a machining gap therebetween in the presence of a liquid machining medium and a succession of electrical discharges are effected between the tool electrode and the workpiece electrode across the machining gap to electroerosively remove material from the workpiece electrode, which machine tool comprises in combination: a machine-head spindle for supporting the movable electrode; first motor means drivingly coupled with the machine-head spindle and responsive to electrical conditions in the machining gap for axially displacing the spindle to move the movable electrode towards and away from the other electrode so as to maintain the machining gap in size substantially constant; and an electrode reciprocating assembly mechanically coupled between the machine-head spindle and the movable electrode and including a rotary member, second motor means drivingly coupled with the rotary member for reciprocating rotating the rotary member through a limited angle of rotation and link means coupled between the rotary member and the movable electrode for converting a reciprocatory rotary motion of the rotary member into a corresponding rectilinear reciprocatory movement of the movable electrode; and reciprocation stroke setting means associated with the second motor means for determining the limited angle of reciprocatory rotary movement of the rotary member to set the stroke of rectilinear reciprocatory movement of the movable electrode at a desired value.

Specifically, the machine tool further comprises reciprocation period setting means associated with the second motor means for determining the rate of rotation of the reciprocating rotated rotary member to set the period of rectilinear reciprocatory movement of the movable electrode at a desired value. Program means may be associated with at least one of the setting means to act on the second motor means for changing at least one of the said angle and rate of rotation in accordance with a preprogrammed format during a given course of EDM operation. Alternatively, machining depth sensing means may be provided for sensing the position of the tool electrode as it is progressively sunk into the workpiece electrode during a given course of EDM operation and controlling at least one of the setting means to act on the second motor means, thereby changing at least one of the said angles and rate of rotation in accordance with the sensed position of said tool electrode during the course of EDM operation. Alternatively or in addition, detector means may be provided responsive to EDM characteristics in the machining gap for controlling at least one of the said setting means to act on the second motor means, thereby changing at least one of the said angles and rate of rotation in accordance with the sensed EDM characteristics during a given course of EDM operation.

Preferably, means is provided for interrupting the operation of the first motor means for a predetermined time period and permitting the second motor means to be operated selectively during the said time period. Advantageously there are provided means for forcibly supplying the liquid machining medium to the machining gap and means for synchronizing the operations of the liquid supply means and the second motor means.

The reciprocating assembly may further comprise a housing securely connected to the machine-head spindle for receiving the rotary member, the second motor means and the link means therein and a piston member arranged coaxially or in parallel with the tool-head spindle and coupled between the link means and the movable electrode. An insulator plate is advantageously disposed between the machine-head spindle and the housing, or the housing advantageously is detachably secured to the machine-head spindle by means of an insulator plate.

The rotary member may be an eccentric cam having a cam shaft rotationally driven by the second motor means and a cam surface in engagement with a planar surface of a body constituting the link means. The body may be a plate attached to the piston member. Alternatively, the rotary member may be a disk rotatable about its shaft and driven by the second motor means and having a crankshaft coupled to the piston.

The invention also provides, in a second aspect thereof, an EDM method wherein a tool electrode and a workpiece electrode, one of which is movable, are spacedly juxtaposed with one another to define a machining gap therebetween in the presence of a liquid machining medium, and a succession of electrical discharges are effected between the tool electrode and the workpiece electrode across the machining gap to electroerosively remove material from the workpiece electrode, which method comprises: (a) supporting the movable electrode with a machine-head spindle; (b) sensing electrical conditions in the machining gap for operating first motor means drivingly coupled with the machine-head spindle to move the movable electrode towards and away from the other electrode so as to maintain the machining gap substantially constant in size by axially displacing the spindle; (c) mechanically coupling between the machine-head spindle and the movable electrode an electrode reciprocating assembly comprising a rotary member, second motor means drivingly coupled with the rotary member and rotation-to-rectilinear motion converting link means coupled between the rotary member and the movable electrode; (d) independently of the movement of the movable electrode by the first motor means in step (b), reciprocating with the said assembly, the movable electrode towards and away from the other electrode with a predetermined stroke of reciprocation by operating the second motor means to reciprocating rotate the rotary member through a predetermined angle of rotation and to cause the link means to convert the reciprocatory rotary movement of the rotary member into a rectilinear reciprocatory movement of the movable electrode; and (e) determining the limited angle of reciprocators rotary movement of the rotary member to set the stroke of rectilinear reciprocatory movement of the movable electrode at a desired value.

Specifically, the method further comprises determining the rate of rotation of the reciprocating rotated rotary member to set the period of rectilinear reciprocatory movement of the movable electrode at a desired value. The method may further comprise changing at least one of the said angle and rate of rotation in accordance with a preprogrammed format during a given course of EDM operation. Alternatively, the method may further comprise sensing the position of the tool electrode being progressively sunk into the workpiece electrode during a given course of EDM operation and controlling at least one of the said angle and rate of rotation so as to change in accordance with the sensed position of the tool electrode during the course of EDM operation. Alternatively or in addition, the method may further comprise sensing EDM characteristics in the machining gap and controlling at least one of the said angle and rate of rotation so as to change in accordance with the sensed EDM characteristics during a given course of EDM operation.

Preferably, the method should further comprise interrupting the operation of the first motor means for a predetermined time period and causing the second motor means to operate selectively during the said time period. The method may further comprise the steps of (f) forcibly supplying the liquid machining medium into the machining gap and (g) synchronizing the operations of steps (d) and (f).

BRIEF DESCRIPTION OF THE DRAWING

These and other objects and features of the present invention as well as advantages thereof will become more readily apparent from the following description taken with reference to the accompanying drawing in which.

SPECIFIC DESCRIPTION

Figure 1:
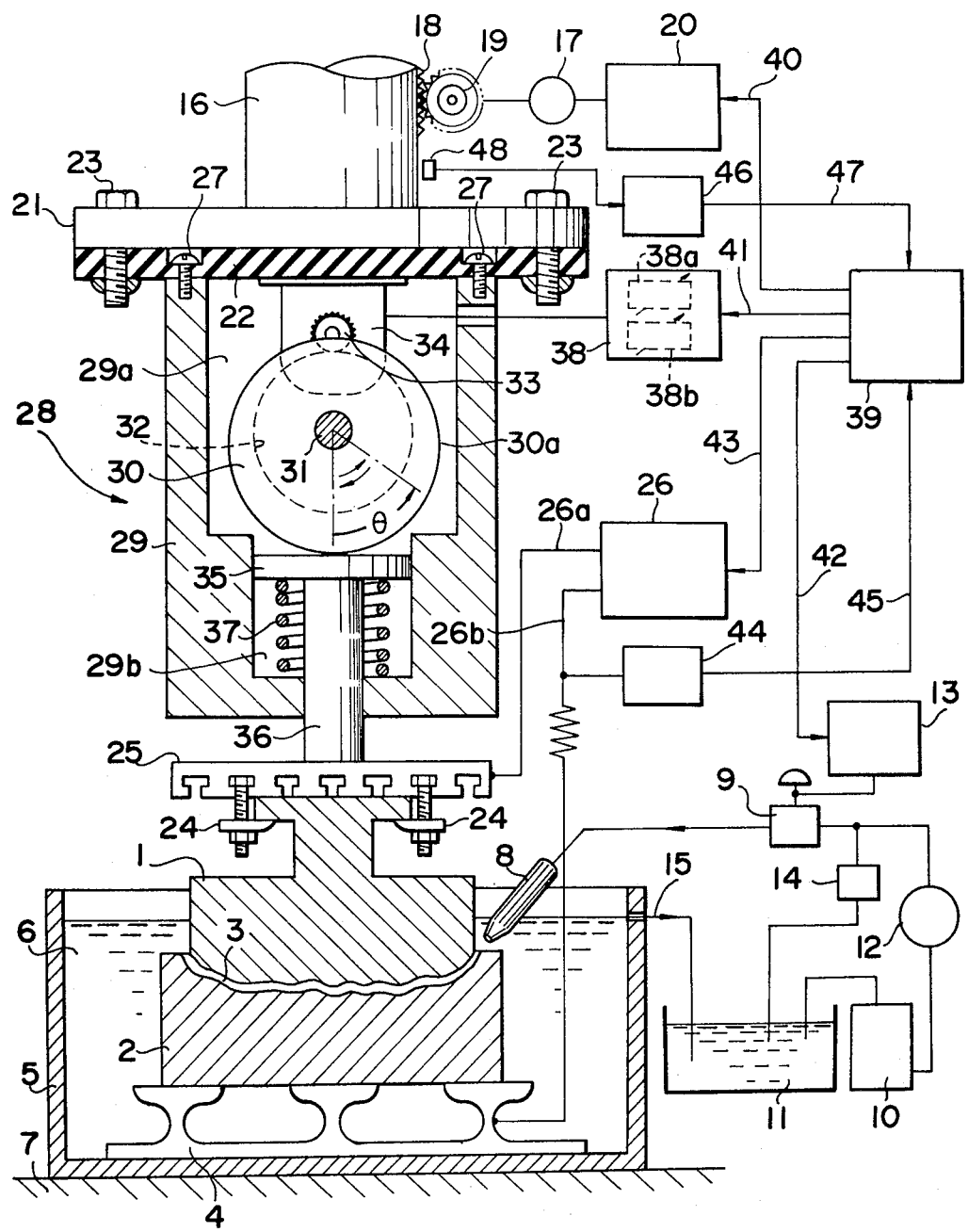
FIG. 1 is a schematic side view partly in elevational section and partly in block form, diagrammatically illustrating a structure embodying the present invention.

Referring now to FIG. 1, a tool electrode 1 is shown spacedly juxtaposed with a workpiece electrode 2 to define a machining gap 3 therebetween. The workpiece 2 is securely mounted on a work support 4 situated in a work tank 5 which contains a liquid dielectric or machining medium 6 (e.g. kerosene, transformer oil, distilled water or weakly conductive water) and which is in turn situated on a work table 7. The liquid machining medium 6 is shown supplied from a nozzle 8 which communicates via a valve 9 and a filter 10 with a reservoir 11. A pump 12 is provided between the filter 10 and the valve 9, the latter being of electromagnetic type and controlledly opened and closed by a valve-control circuit 13. A relief valve 14 is also provided and arranged in shunt across the pump 12 and the filter 10 to return the pumped liquid to the reservoir 11 when the valve 9 is closed. The spent machining liquid 6 in the work tank 5 is returned to the reservoir 11 via an outlet conduit 15.

The tool electrode 1 is supported movably with a machine-head spindle 16 which is here vertical and movably supported with a machine head or ram (not shown) and with which a first motor 17 is drivingly coupled by means of, for example, a rack 18 and pinion 19. As will be described hereinafter in more detail, the motor 17 is operated by a servo circuit 20 in response to a gap signal, e.g. gap voltage, for axially displacing the spindle 16 to vertically move the tool electrode 1 towards and away from the workpiece 2 so as to maintain the machining gap 3 substantially constant in size.

The machine-head spindle 16 has an enlarged plate 21 to which an electrically insulating plate 22 is securedly held by means of bolts 23.

The tool electrode 1 is securely fixed by means of clamps and bolts 24 to an electrode attachment plate 25.

An EDM power supply 26 has a pair of output terminals 26a and 26b which are electrically connected to the electrically conductive attachment plate 25 and the electrically conductive work support 4, respectively, to apply a succession of EDM pulses between the tool electrode 1 and the workpiece electrode 2 across the machining gap 3. Thus, a succession of electrical discharges are created between the tool electrode 1 and the workpiece electrode 2 across the machining gap 3 in the presence of the liquid machining medium 6 to electroerosively remove material from the workpiece electrode 2.

In the conventional arrangement, the electrode attachment plate 25 or the tool electrode 1 itself is directly secured to the metallic plate 21 by means of bolts 23 or to the insulator plate 22 by means of bolts 27.

In accordance with the present invention, an electrode reciprocating assembly 28 is mechanically coupled between the machine-head spindle 16 and the tool electrode 1. The assembly 28 shown includes a housing 29 detachably secured to the insulator plate 22. An eccentric cam 30 is accommodated in a compartment 29a defined by the housing 29 and has a rotary shaft 31 secured thereto. The cam 30 is formed with a gear 32 in mesh with a gear 33 rotationally driven by a motor 34 which is mounted on the insulator plate 22. The cam surface 30a of the cam 30 is here circular and in bearing contact with a plate 35 secured to a piston 36 at its upper end. The piston 36 is here arranged coaxially with the machine-head spindle 16, i.e. has its longitudinal center axis in coincidence with or parallel with the longitudinal center axis of the spindle 16, and has its lower end secured to the electrode attachment plate 25. The plate 35 is slidably received in a recess 29b formed in the housing 29 and a spring 37 is inserted in the recess 29b to bias the plate 35 upwards and to hold it in bearing contact with the cam surface 30a. The motor 34 may be a stepping motor or a DC or AC motor equipped with an encoder for sensing the angle and preferably also the rate of rotation.

The motor 34 is energized by a cyclic drive signal furnished by a driver circuit 38. Each cycle of the drive signal furnished by the driver circuit 38 consists of one half cycle of one polarity and the other half cycle of the other polarity which alternate. Accordingly, the cam or eccentric rotary member 30 is reciprocating rotated through a limited angle $\theta$ of rotation, the angle $\theta$ being determined by the duration of the half cycle or one half of the period of the cyclic drive signal. This reciprocatory rotary motion of the cam 30 is converted by the plate 35 or link into a corresponding rectilinear reciprocal motion of the piston 36 and hence of the tool electrode 1 vertically towards and away from the workpiece 2. It will be apparent that the stroke of the resulting reciprocation (rectilinear) of the tool electrode is determined by the angle of rotation $\theta$ ($0 < \theta \leq 180°$ C.). The cam 30 has the position of origin when its maximum diameter, the diameter which intersects its center of rotation or shaft, is oriented vertically as shown.

The stroke of reciprocation of the tool electrode 1 corresponds to the difference between its lowermost and uppermost positions. These positions are taken by the tool electrode when the cam 30 lies at the original position and when it is rotated by an angle $\theta$, respectively. In typical EDM operations, the stroke should range between 0.005 and 1.0 mm and preferably between 0.01 and 0.5 mm. To allow a desired value of the stroke to be established or a preselected number of different values of the stroke to be sequentially established by changeover, the driver circuit 38 is provided with an electrode reciprocation stroke setting unit 38a which includes different settings for the angle of rotation $\theta$ of the cam 30 (and hence corresponding settings of the angle of rotation of motor 34) to be selectively established.

It will be apparent that once the stroke of reciprocation of the tool electrode 1 is given, its period is determined from the rate of rotation of the motor 34 or the cam 30. To allow a desired value of the period of reciprocation to be established or a preselected number of different values of the period to be sequentially established by changeover, the driver circuit 38 is provided with an electrode reciprocation period setting unit 38b which includes different settings for the rate of rotation dθ/dt of the cam 30 (and hence the motor 34) to be selectively established.

Preferably the electrode reciprocation assembly is operated in conjunction with the servo-feed operation by the first motor 17 and the dielectric flushing operation by the nozzle 8. A control unit 39 is thus provided to furnish respective control signals to the servo circuit 20, the driver circuit 38 and the valve-control circuit 13 via lines 40, 41 and 42, and additionally to the EDM power supply 26 via a line 43.

The control unit 39 is here provided also with two signal inputs. One signal comes from a gap sensing circuit 44 via a line 45 and the other signal comes from a machining depth detector 46 via a line 47. The gap sensing circuit 44 responds to a gap voltage or current. This gap signal is passed through the control unit 39 and applied via line 40 to the servo circuit 20 which operates in a conventional manner to provide servo signals to the servo motor 17. The gap signal may also be processed in the control unit 39 to result in the respective control signals which can be applied to the driver circuit 38, the EDM power supply 26 and the valve-control circuit 13. The depth detector 46 responds to position signals which are sensed by an encoder 48 associated with the machine-head spindle 16. The position of the spindle 16 represents the position of the tool electrode 1 being progressively sunk into the workpiece electrode 2.

The control signal supplied to the valve-control circuit 13 via the line 42 is produced by the control unit 39 when the processing of gap signals incoming from the sensor 44 indicates that the liquid machining medium in the machining gap 3 has become contaminated beyond a certain level. The control signal may be in the form of a succession of electrical pulses which periodically opens the electromagnetic valve 9 to allow the fresh machining medium drawn by the pump 12 from the reservoir 11 via the filter 10 to be intermittently flushed into the machining gap 3. The rate of flow of the flushing liquid may be controlled depending on particular levels of the gap contamination.

It is desirable that the reciprocation of the tool electrode 1 by the assembly 28 be synchronized with the continuous or intermittent flushing of the machining medium into the machining gap 3. When the liquid flushing is conducted intermittently, it is also desirable to ensure that the machining liquid is forced into the machining gap 3 during the time in which the tool electrode 1 is retracted from the workpiece electrode 2 in each reciprocation cycle. For that purpose synchronizing signals are developed in lines 41 and 42.

It has been found to be further desirable that the electrode-servo operation (especially advance or downward movement) by the motor 17 acting on the machine-head spindle 16 be interrupted while the electrode-reciprocation operation by the assembly 28 is being conducted.

In a typical operating mode of the overall system, when an excessive gap contamination is detected, the control unit 39 operates to furnish a gap flushing command signal to the valve-control circuit 13 and simultaneously to furnish an electrode reciprocation signal to the motor driver circuit 38 while applying a servo interruption signal to the servo motor driver circuit 17 for a predetermined time period or until a clarification of the gap contamination is indicated based upon gap signals furnished from the gap sensing circuit 44. The machining depth detector 46 provides an electrode position signal which is processed by the control unit 39 to result in control signals which act on the setting units 38a and 38b to establish a particular stroke and period of the electrode reciprocation preselected to correspond to a particular depth of the tool electrode 1 in the workpiece sensed by the detector 46 and the associated encoder 48. During this time period, the EDM power supply 26 is also acted upon by a command signal furnished via the line 43 from the control unit 39 to suspend the application of machining electrical pulses to the tool and workpiece electrodes 1 and 2.

Figure 2:
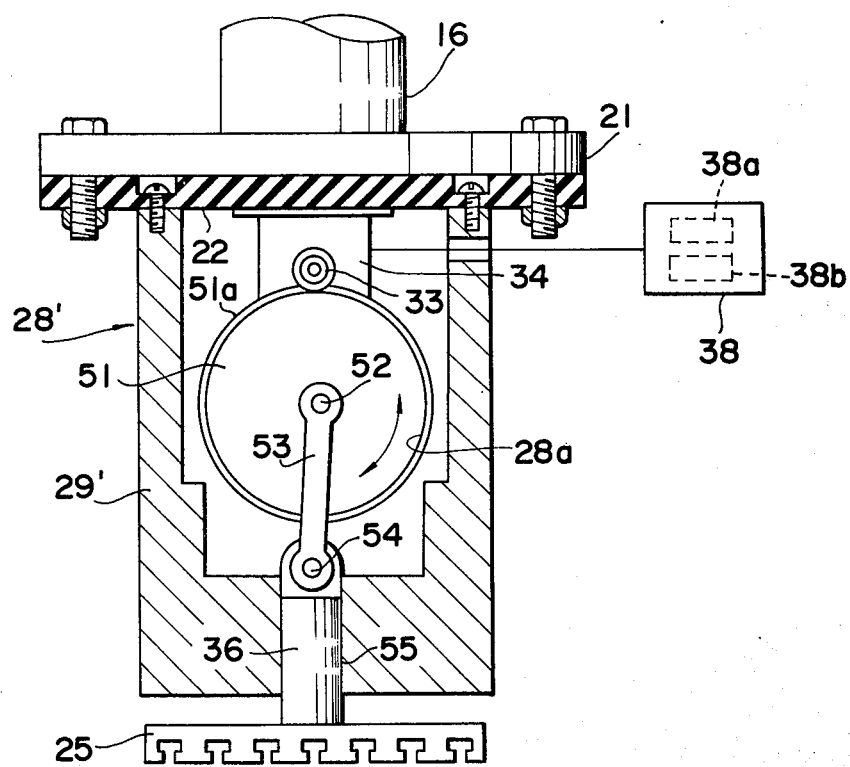
FIG. 2 is a schematic elevational view partly in section illustrating an essential portion of another embodiment of the present invention.

FIG. 2, in which same reference numerals as in FIG. 1 designate same or similar components, shows another form of the electrode reciprocation assembly 28' embodied to utilize a crank arrangement. This arrangement is shown comprising a circular disk 51 whose geared periphery 51a is in mesh with the gear 33 rotationally driven by the motor 34 to rotate about its center. The disk 51 has a crankshaft 52 at a position slightly displaced from that center. The crankshaft 52 is linked by a crank or connecting rod 53 and a crankpin 54 with the piston 36 secured to the electrode attachment plate 25. The piston 36 is here slidably received in an opening 55 formed in the housing 29' at its lower portion.

The motor 34 is here again energized by a cyclic drive signal furnished from the driver circuit 38. Each cycle of the drive signal furnished from the driver circuit 38 consists of one half cycle of one polarity and the other half cycle of the other polarity which alternate. Accordingly, the disk 51 is reciprocating rotated through a limited angle of rotation, which is determined by the duration of the half cyclic or one half of the period of the cycle drive signal. This reciprocatory rotary motion is here again converted, by the crank 53, into a corresponding rectilinear reciprocal motion of the piston 36. Here again, the stroke and period of electrode reciprocation are accordingly determined by the angle and rate of rotation of the motor 34 and are set at the setting units 38a and 38b, respectively, in the motor driver circuit 38.

With the conventional arrangement in which the machine-head spindle 16 itself is reciprocated, the actual machining time amounts only to one third ($\frac{1}{3}$) of the total machining time, the balance ($\frac{2}{3}$) being taken up by the electrode reciprocation. With an arrangement according to the present invention, it has been found that the time for reciprocation can be reduced to one third ($\frac{1}{3}$) of the total machining time, the remaining time being used for actual machining.

It should be understood that the reciprocation of the tool electrode 1 need not be limited to be in the vertical direction and may instead be effected in a horizontal plane or in a direction orthogonal to the vertical direction in which the spindle 16 is moved. This form of electrode reciprocation may be used to enlarge an EDM cavity in the workpiece in a finishing operation by a desired size corresponding to the length of the stroke of reciprocation.

What is claimed is:

1. In an EDM machine tool for machining a workpiece electrode wherein a tool electrode and the workpiece electrode one of which is movable are spacedly juxtaposed with one another to define a machining gap therebetween in the presence of a liquid machining medium and a succession of electrical discharges are effected between the tool electrode and the workpiece electrode across the machining gap to electroerosively remove material from the workpiece electrode, the combination of:
a machine-head spindle for supporting said movable electrode;
first motor means drivingly coupled with said machine-head spindle and responsive to electrical conditions in said machining gap for axially displacing said spindle to move said movable electrode towards and away from the other electrode so as to maintain said machining gap in size substantially constant; and
an electrode reciprocating assembly mechanically coupled between said machine-head spindle and said movable electrode and including a rotary member, second motor means operable independently of said first motor means and drivingly coupled with said rotary member for reciprocatingly angularly displacing said rotary member through only a limited angle $\theta$ of rotation where $0° < \theta \leq 180°$ and link means coupled between said rotary member and said movable electrode for converting the reciprocatory angular displacement of said rotary member into a corresponding rectilinear reciprocatory movement of said movable electrode; and
reciprocation stroke setting means associated with said second motor means for determining said limited angle $\theta$ of reciprocatory angular displacement of said rotary member so as to set the stroke of rectilinear reciprocatory movement of said movable electrode at a desired value.

2. The combination defined in claim 1, further comprising reciprocation period setting means operable independently of said reciprocation stroke setting means and associated with said second motor means for determining the rate of rotation of said reciprocatingly angularly displaced rotary member to set, independently of said stroke, the period of rectilinear reciprocatory movement of said movable electrode at a desired value.

3. The combination defined in claim 2, further comprising program means associated with at least one of said setting means to act on said second motor means for changing at least one of said angle and rate of said reciprocatory angular displacement in accordance with a preprogrammed format during a given course of EDM operation.

4. The combination defined in claim 2, further comprising machining depth sensing means for sensing the position of said tool electrode being progressively sunk into said workpiece electrode during a given course of EDM operation and controlling at least one of said setting means to act on said second motor means, thereby changing at least one of said angle and rate of rotation in accordance with the sensed position of said tool electrode during said course of EDM operation.

5. The combination defined in claim 2, further comprising detector means responsive to EDM characteristics in said machining gap for controlling at least one of said reciprocation stroke and period setting means to act on said second motor means, thereby changing at least one of said angle and rate of rotation in accordance with said EDM characteristics during a given course of EDM operation.

6. The combination defined in claim 1, further comprising means for interrupting the operation of said first motor means for a predetermined time period and permitting said second motor means to be selectively operated substantially during said time period.

7. The combination defined in claim 1 or claim 6, further comprising means for forcibly supplying said liquid machining medium into said machining gap and means for substantially synchronizing the operations of said liquid supply means and said second motor means.

8. The combination defined in claim 1 wherein said electrode reciprocating assembly further comprises a housing securely connected to said machine-head spindle for receiving said rotary member, said second motor means and said link means therein and a piston member arranged coaxially or in parallel with said tool-head spindle and coupled between said link means and said movable electrode.

9. The combination defined in claim 8, further comprising an insulator plate disposed at an interface between said machine-head spindle and said housing.

10. The combination defined 8 wherein said housing is detachably secured to said machine-head spindle by means of an insulator plate.

11. The combination defined in claim 8 wherein said rotary member is an eccentric cam having a cam shaft rotationally driven by said second motor means through said limited angle and a cam surface for engagement with a planar surface of a body constituting said link means.

12. The combination defined in claim 11 wherein said body is a plate attached to said piston member.

13. The combination defined in claim 8 wherein said rotary member is a disk rotatable by said limited angle $\theta$ about its shaft by said second motor means and having a crankshaft coupled to said piston.

14. In an EDM method wherein a tool electrode and a workpiece electrode, one of which is movable, are spacedly juxtaposed with one another to define a machining gap therebetween in the presence of a liquid machining medium and a succession of electrical discharges are effected between the tool electrode and the workpiece electrode across the machining gap to electroerosively remove material from the workpiece electrode, the improvement which comprises:
(a) supporting said movable electrode with a machine-head spindle;
(b) sensing electrical conditions in said machining gap for operating first motor means drivingly coupled with said machine-head spindle to move said movable electrode towards and away from the other electrode so as to maintain said machining gap substantially constant in size by axially displacing said spindle;
(c) mechanically coupled between said machine-head spindle and said movable electrode an electrode reciprocating assembly comprising a rotary member, second motor means drivingly coupled with said rotary member and rotation-to-rectilinear motion converting link means coupled between said rotary member and said movable electrode;
(d) independently of the movement of said movable electrode by said first motor means in step (b), reciprocating with said assembly said movable electrode towards and away from said other electrode with a predetermined stroke of reciprocation by operating said second motor means to reciprocatingly rotate said rotary member through a predetermined angle of rotation $\theta$ where $0° < \theta \leq 180°$ and to cause said link means to convert the reciprocatory rotary movement of said rotary member into a rectilinear reciprocatory movement of said movable electrode; and
(e) determining said limited angle $\theta$ of reciprocatory rotary movement of said rotary member to set the stroke of rectilinear reciprocatory movement of said movable electrode at a desired value.

15. The method defined in claim 13, further comprising determining the rate of rotation of said reciprocatingly rotated rotary member to set the period of rectilinear reciprocatory movement of said movable electrode at a desired value.

16. The method defined in claim 15, further comprising changing at least one of said angle and rate of said reciprocatory rotation in accordance with a preprogrammed format during a given course of EDM operation.

17. The method defined in claim 15, further comprising sensing the position of said tool electrode being progressively sunk into said workpiece electrode during a given course of EDM operation and controlling at least one of said angle and rate of said reciprocatory rotation so as to change in accordance with the sensed position of said tool electrode during said course.

18. The method defined in claim 15, further comprising sensing EDM characteristics in said machining gap and controlling at least one of said angle and rate of said reciprocatory rotation so as to change in accordance with said sensed EDM characteristics during a given course of EDM operation.

19. The method defined in claim 14, further comprising interrupting the operation of said first motor means for a predetermined time period and causing said second motor means selectively to operate substantially during said time period.

20. The method defined in claim 14 or 19, further comprising the steps of (f) forcibly supplying said liquid machining medium into said machining gap and (g) substantially synchronizing the operation of steps (d) and (f).

* * * * *